United States Patent [19]

Westerink et al.

[11] Patent Number: 5,684,511

[45] Date of Patent: Nov. 4, 1997

[54] CONSUMER APPARATUS PROVIDED WITH A PROGRAMMING SYSTEM BY MEANS OF A FORM-FILLING TYPE DISPLAY

[75] Inventors: Joanne H. D. M. Westerink; Josephus H. Eggen; Reinder Haakma, all of Eindhoven, Netherlands

[73] Assignee: U.S. Philips Corporation, New York, N.Y.

[21] Appl. No.: 642,804

[22] Filed: May 3, 1996

Related U.S. Application Data

[63] Continuation of Ser. No. 429,440, Apr. 27, 1995, abandoned, which is a continuation of Ser. No. 226,444, Apr. 12, 1994, abandoned, which is a continuation of Ser. No. 949,283, Sep. 22, 1992, abandoned.

[30] Foreign Application Priority Data

Oct. 2, 1991 [EP] European Pat. Off. ............ 91202564

[51] Int. Cl.[6] ....................................................... G09G 5/08
[52] U.S. Cl. ............................ 345/157; 345/145; 345/146
[58] Field of Search ........................................ 345/157, 145, 345/146, 160, 161, 162, 163, 168, 156; 348/734; 395/352, 353, 354

[56] References Cited

U.S. PATENT DOCUMENTS

| | | | |
|---|---|---|---|
| 4,626,892 | 12/1986 | Nortrup et al. | 358/22 |
| 4,796,019 | 1/1989 | Auerbach | 340/709 |
| 4,931,957 | 6/1990 | Takagi et al. | 345/156 |
| 5,204,947 | 4/1993 | Bernstein et al. | 345/146 |

FOREIGN PATENT DOCUMENTS

| | | | |
|---|---|---|---|
| 0306909 | 3/1989 | European Pat. Off. | G11B 27/34 |
| 91202565.7 | 10/1991 | European Pat. Off. | |
| 58-21268 | 6/1983 | Japan | G11B 27/10 |
| 2287990 | 11/1990 | Japan | G11B 27/10 |

OTHER PUBLICATIONS

"Three–Level Audio Object Display for a Personal Computer Audio Editor" IBM Technical Disclosure Bulletin, vol. 30, No. 10, Mar. 1988, NY US pp. 351–353.

*Primary Examiner*—Richard Hjerpe
*Assistant Examiner*—Xiao M. Wu
*Attorney, Agent, or Firm*—Edward W. Goodman

[57] ABSTRACT

A consumer apparatus has an executing mode and a specifying mode. In the latter an array of formalized specifying proposals is displayed. The device has a cursor for stepping through the array for so selectively highlighting one of the array elements. Thereupon, for that actualized element a list of prestored proposals can be cycled through, while they are selectable displayed as collocated with the associated array element.

15 Claims, 7 Drawing Sheets

5,684,511

CONSUMER APPARATUS PROVIDED WITH A PROGRAMMING SYSTEM BY MEANS OF A FORM-FILLING TYPE DISPLAY

This is a continuation of application Ser. No. 08/429,440, filed Apr. 27, 1995, now abandoned, which is a continuation of application Ser. No. 08/226,444, filed Apr. 12, 1994 (now abandoned); which was a continuation of application Ser. No. 07/949,283, filed Sep. 22, 1992 (now abandoned).

FIELD OF THE INVENTION

The invention relates to a consumer apparatus having at least an executing mode and a specifying mode that are selectable by a physical actuation means. Various present day consumer apparatus offer a wide gamut of operating modes, submodes, selectable parameter values, and a corresponding range of controls that often bedazzles any human user who is gifted with only limited procedural intelligence. Well known examples are cameras, tape recorders, and digital car radios. Nevertheless, various user features are considered as promotional pluses, even if hardly ever used in practice.

DESCRIPTION OF THE RELATED ART

A well known way to alleviate the problem of choosing and parameter setting is through menuing. Menuing is organized like a tree: on a first level, the menu shows all items that can be selected, and upon selecting, a next lower level menu is displayed. Often, at that instant, the user forgets what possibilities had been foregone earlier in the choosing, or what is the exact value of a parameter that had been set earlier. A possible solution is windowing that allows for displaying several successive menu levels, but this requires a very sophisticated display control system, with a large display that is, moreover, aesthetically quite unpleasant.

SUMMARY OF THE INVENTION

Accordingly, among other things, it is an object of the present invention to render handling of the specifying mode as easy as possible to the inexperienced user while keeping the required display functionality at an elementary level. According to a first aspect, the invention realizes the object in that it is characterized by having visual display means for, in said specifying mode, displaying an array of formatized specifying proposals, cursoring means for stepping along and actualizing elements of said array, and cycling means for, with respect to at least one actualized element, cycling through a list of prestored proposals with respect to that element, for display of a selectable one of said proposals collocated with said element. In particular, this means that various parameter values can be updated, for example in a trial and error operation through stepping back and forth through the array. Moreover, the prestored proposals not only indicate the value of the parameter itself, but also the aspect to which the parameter refers, such as:

shutter diameter is now ... - exposure time is now ... - focus distance is now ... -.

Also, the co-located display allows for easy understanding and improved user-friendliness.

Advantageously, said array is one dimensional. Especially if the proposals are verbally represented, this means that they occupy much horizontal extent and little vertical extent. A good solution is then a single vertical file of proposals. Also, cursoring would then need only two buttons, or if cyclical, even only a single one.

Advantageously, said apparatus would have fixating means for fixating any actually displayed proposal for aggregate execution in said execution mode. This would allow to specify a plurality of proposals in parallel, and with respect to several objects.

Advantageously, said apparatus has level stepping means for, with respect to said actualized element, stepping to a different level of further actualized proposals, and wherein any lower level proposal is more specific than a higher level proposal pertaining to the same element. This allows for running complex specifying procedures, while still enabling a relatively inexperienced user to realize the extent of his past actions in specifying.

Advantageously, any said actualized element is highlighted with respect to any other element. This improves visibility.

Advantageously, said second array is substantially one-dimensional along a first cursoring axis which differs from a second cursoring axis of any higher level and also substantially one-dimensional array of elements. Reserving cursoring in one particular direction for a quite specific object renders control easier.

Advantageously, said level stepping means is a particular cursoring actuation element that enables level stepping upon reading an end of its associated cursoring motion direction. This has been found an ergonomical boon.

Advantageously, said apparatus has a plurality of cursoring actuation elements, of which only a first one enables downstepping whereas all others exclusively enable upstepping through said levels. Downstepping is a specific operation whereas upstepping is felt generally as being less specific. Assigning the downstepping to a single element of the cursor control has been found a comfortable solution.

According to a particular advantageous aspect of the invention, it has further visual display means for indicating respective different activity levels of information present on said medium, as representable in a length-proportional display of identifiable discrete parts of said information as being further specified by a representation associated to said actualized element. It has been found a user-friendly solution to have a length-proportional display, showing the position in time where the operation specified by the form filling would have effect. The latter would specify what action, and where the action is to take place. As to the length-proportional display in particular, various aspects thereof have been disclosed and claimed in co-pending application EP 91202565.7 (PHN 13.839), herein incorporated by reference.

BRIEF DESCRIPTION OF THE FIGURES

The invention will be explained more in detail with respect to a preferred embodiment. Therein.

DESCRIPTION OF A PREFERRED EMBODIMENT

Figure 1:
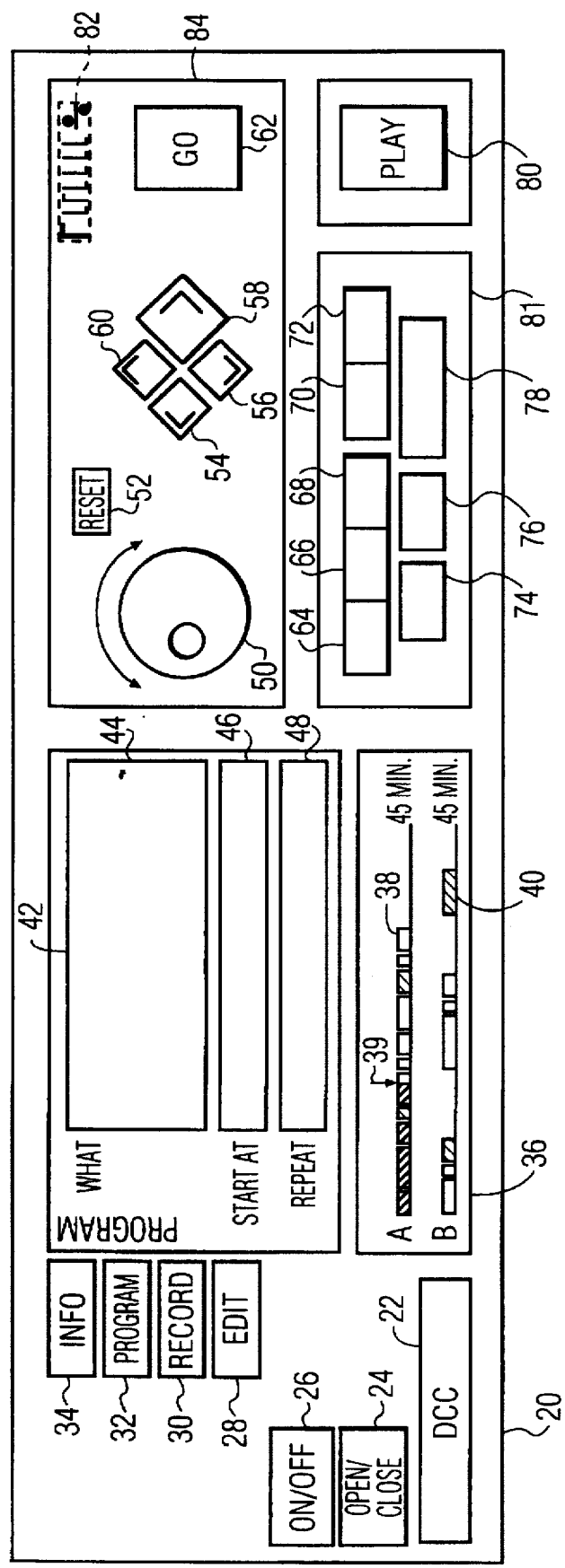
FIG. 1 is an exemplary front plate layout.

FIG. 1 is a front plate 20 layout, shown in program mode layout, of a digital cassette audio tape recorder. Block 22 is the lid of the tape tray, button 24 controls open/close of this lid with automatic ejection, button 26 controls on/off of the whole apparatus. Button 28 starts edit mode. Button 30 starts record mode. Button 32 starts program mode. Button 34 starts information mode. Block 36 has the two length-proportional bar displays that allow for each of a set of identifiable discrete information items of at least a particular minimum length a steady indication of either a disactivated condition (here grey), a past condition (black/dark grey) or a future condition (white). Any other combination of grey levels, colors, hatchings, blinking, etcetera, would be feasible as well. In the example, the minimum physical length of a block would correspond to about ½ minute of tape, but this is due to the pixeled granularity of the display. If it is necessary to indicate still shorter items, various solutions would offer themselves in the environment of the invention. First, a single short item wedged between two relatively long ones could be -artificially- lengthened somewhat to the detriment of one or both of its longer neighbors. Second, a separate indication, such as another color or greyness level could indicate -one or more very short items-. Third, such very short item could be suppressed. Various other solutions would be feasible as well. The display can be scaled up or down for various reasons. First, it could be automatically. Depending on the playing time of the medium, the scale can be always adjusted in such a way that actual display would substantially fill all of the available space in block 36. In another realization (not shown), the scaling would be manually controlled, possibly in such a way that the cursor would remain in the center of the display. Especially in this situation, items that were long enough could have some simple identifier displayed within, such as a sequence number corresponding to the numbering that will be described hereinafter. The effective display of the short items, supra, could then be automatically updated in line with effective scale. Now, the displays for side A and side B are separate as shown. Physically, the tape has two separate recordings side by side, both of 45 minutes length. Side B has empty spaces, which differs from a deactivated (—light grey) condition, in that usually, deactivation can be reversed by different programming. Each block is called a track. Blocks have unlimited maximum length as far as physically possible. Solid arrow 39 indicates actual position of pick-up element/recording head. Inasmuch as the two sides of the tape are physically alongside, switchover of the pick-up element between the two sides can be done quasi-instantaneously. Physically, the display can be liquid crystal, LED, CRT, electrochromic, or other. Block 42 shows proposed control actions in program mode that will be detailed hereinafter, and contains subblocks 44, 46, 48. The various display elements in block 42 may be in the same technology as block 36 or not. Block 84 houses various special controls. Rotary button or joggle 50 for an activated block (44, 46, 48) cycles all associated proposals through the display format. It has reset button 52 to a default state. Buttons 54, 56, 58, 60 are a four-way cursor mover. Button 56 moves downward, button 58 to the right, button 60 upward, button 54 to the left. They select the active proposal in block 42, in a way that will be described in detail hereinafter. Button 58 is one size bigger. Another solution is having it the same size as, but a different color from the other three. Cursor 39 is not moved, because this represents actual physical position of the pick-up element. Button 62 activates leaving the control protocol for action. Word 82 is a manufacturer trademark. The other buttons are conventional control buttons for an audio tape recorder and will not be discussed for brevity. Although not extensively disclosed herein, the invention would be just as feasible with remote control, speech-controlled apparatus, or other user-activity signalization.

Figure 2:
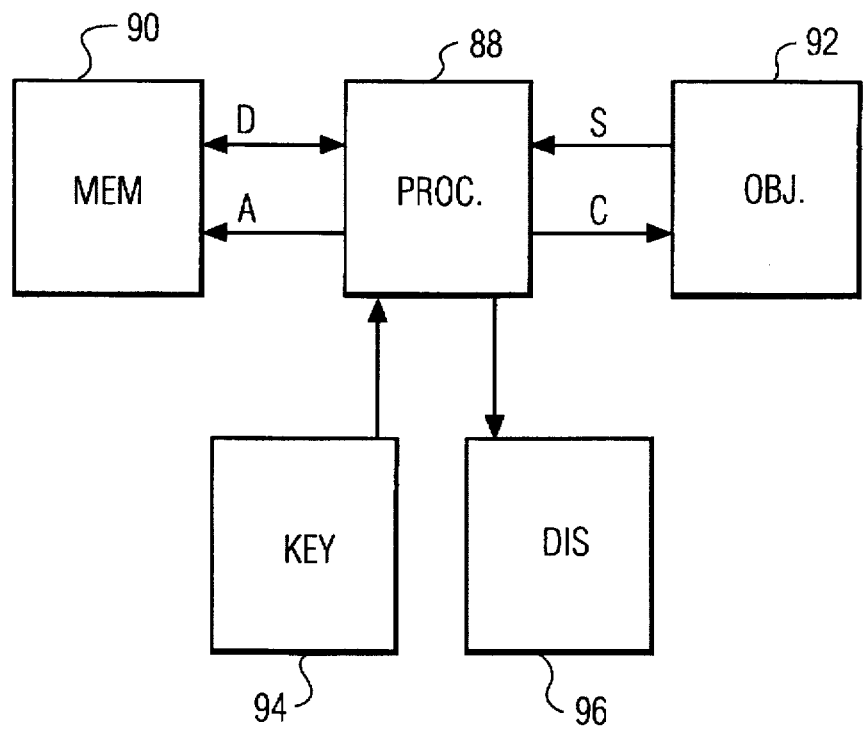
FIG. 2 is a block diagram of the apparatus.

FIG. 2 is a block diagram of an apparatus according to the invention. The apparatus' object (disc, tape or other) 92 gets control signals C and produces sensor signals S. Latter may be data from TOC and/or other identifiers, and also the signals that a user could intend to utilize and which in principle would be digital as well. However, there is no a priori bar against analog signals. Furthermore, signals S could be physical sensor data such as object (disc, tape or other) present/absent, spin up/spin down, forward/reverse, correct/unallowable command, and various others. Block 94 is a set of user activatable keys. Block 96 is a user display that displays part of FIG. 1. Keys and display may be joined in the way of a soft keyboard. The keys and display have been treated supra. Block 90 represents a memory. For one, it operates as actual memory, for example, in that it stores the table of contents (TOC) of the object as soon as possible upon presentation of the object to the apparatus in question, so that the table of contents could be read therefrom. This reading can be activated automatically if this table of content is stored at default location (first revolution track of a compact disc) or is distributively readable, so that only a small stretch of the (tape) medium need to pass the pick-up element. In another organization, a specific command could be necessary for reading the table of contents. Furthermore, the memory may store more or less permanently general purpose information or such information that had been presented by the user person. After the relevant information had been stored, or for non-object related information, already from the beginning, such information can be addressed by signals A, and thereupon be provided as data D to processor 88. Processor 88 interfaces to all other subsystems mentioned. By itself, the processor functions are straightforward, only the interaction with display/keyboard lending any specific performance thereto. Timing, flowcharting, and policy would be clear from the descriptions of the various display formats hereinafter.

THE DISPLAY FORMATS

Hereinafter, a set of display formats are discussed that are organized according to four different families. Each respective family is activated by its own selection button 28–34 in FIG. 1. In addition, the PLAY button 80 controls standard play modes. In addition to the discussion of the display, also the activation within each family with respect to buttons 50–62 will be discussed. Generally, the display pages according to the invention do not show a menu, from which a future choice may be made, because this has been found confusing for an unskilled user. In contradistinction, as far as executable operations concerns, the display formats for any partial function show a formalized proposal. Any such proposal can be fixed as it is shown. Such fixation for the aggregate of actual proposals shown is activated by fixating button 62. The above means that effectively the display shows a wholly or partially filled in form, showing all entries that have been made in the past (actually or by default) and also, where an entry may be modified: the highlighting can be an increased luminosity of the block edge or of its text, blinking, a specific indication such as an index finger, colored asterisk, and other.

Figure 3:
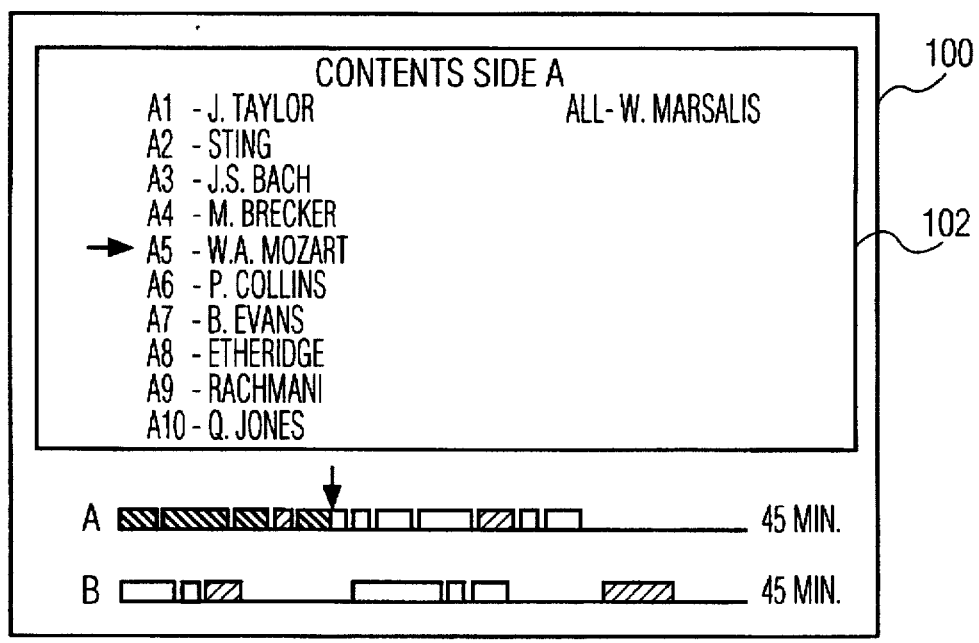
FIG. 3 is an INFORMATION layout.

Now, FIG. 3 is an INFORMATION layout. It shows contents of side A as read from TOC, and moreover, actual pick-up element position, both on the time bar display and on the list of contents, each time in the form of a black arrow. In contradistinction to the earlier convention, black is past, white is future, grey is deactivated, "no block" shown means empty or erased. The time length-proportional display also shows normal playing time of each side. Block 100 is the display perimeter, block 102 is the specific display of this format. Pressing reset button 52 will show the display of side A. Rotating rotary button 50 of FIG. 1 will present other displays. One position clockwise rotated will show the same content display for side B. One further position clockwise rotated will show actual track as selected by the position of the pick-up element, to wit: number and label or name, length of actual track and time instant within the playing interval of actual track. One further position clockwise rotated will show actual track as selected by actual position of cursor element, to wit: number and label, and furthermore a part of the song lyrics in the neighbourhood of the pick-up element's position. In practice, these are the lyrics of the next 30-seconds or so interval. Note that activating the Info button 34 does not interfere with the playing operation of the tape recorder. During INFORMATION display, buttons 54-62 are deactivated.

Figure 4:
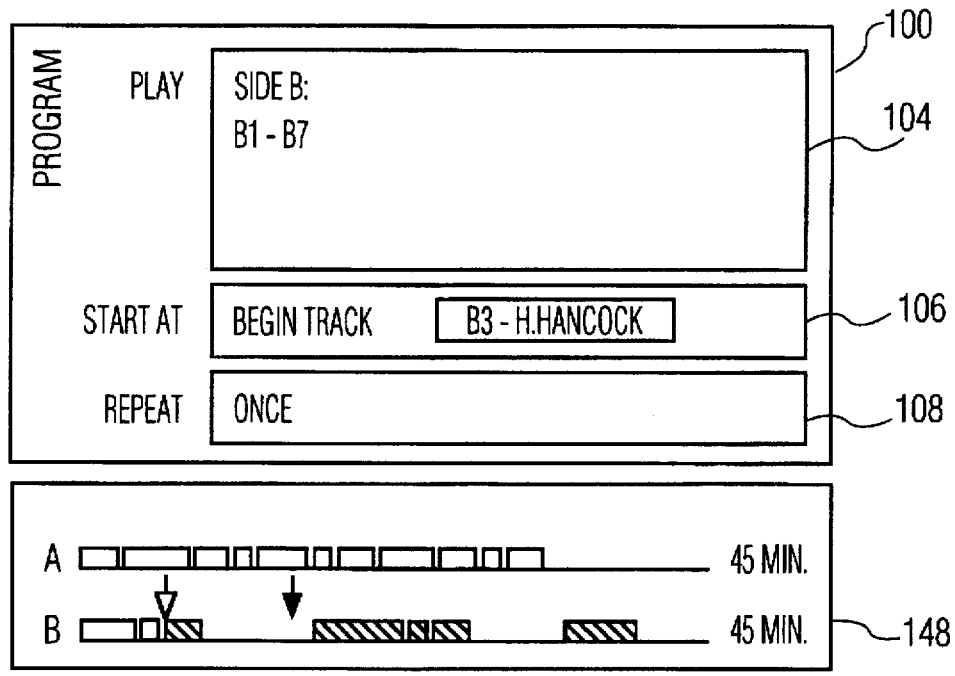
FIGS. 4, 5, 6 are PROGRAM layouts.
Figure 5:
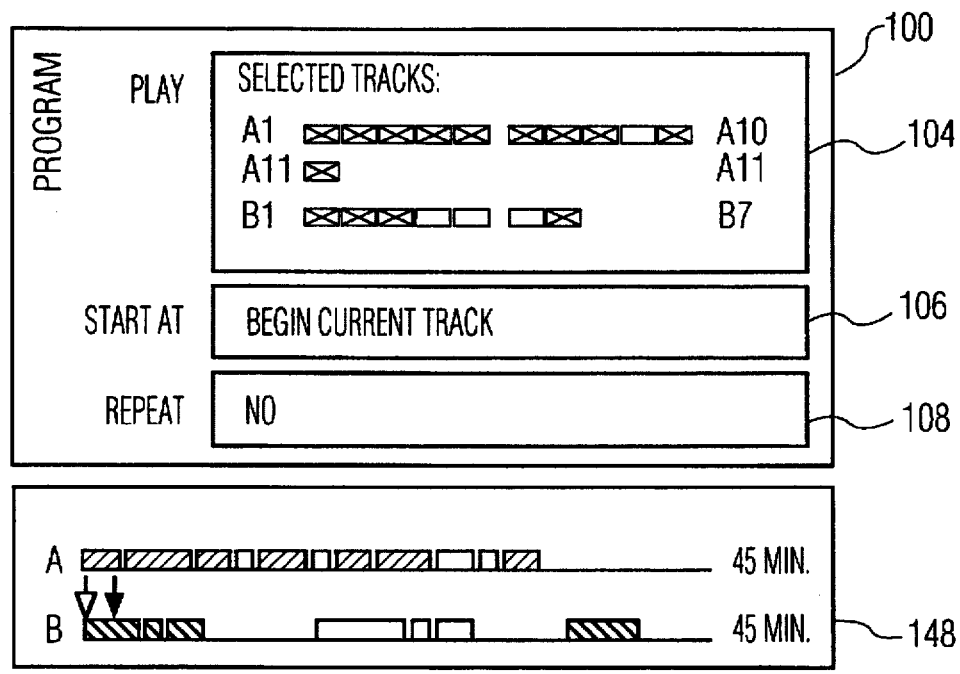

FIGS. 4, 5 are PROGRAM layouts that are activatable by button PLAY, or generally, by any button in block 81, because actuation of such button could influence the actual reproduction operation. In certain circumstances, for example, in the RECORD situation, for reasons of safety, some more specific operation is necessary to reach a play situation, which, however is a standard feature of players that have a recording capability, and, moreover, it is not related per se to the present invention. PROGRAM has three subblocks 104-108. Pressing "PROGRAM" 32 will always highlight the first block 104, highlighting per se not being shown in the Figure. Pressing cursor button 56 will step highlighting to the next lower block, until block 108 is reached. Pressing cursor button 60 will step highlighting to the next higher block, until block 104 is reached. Alternatively, the blocks could form a cyclical chain.

Now pressing reset 52 produces the default content for the highlighted block. Rotating rotary button 50 cycles the content displayed along a sequence of items predetermined for the highlighted block. For block 104, these items are for example:
 Default: first side A, then side B
 other proposals:
  first side B, then side A
  only side A
  only side B (this one shown)

Pressing cursor button 58 will actuate the next lower level for the highlighted block, if existing. The operation of cursor buttons 56, 60 only depends on what is actually displayed, irrespective of what level is actually displayed in the relevant block. The transition to the next lower level is only relevant if cursoring within the actually highlighted block is impossible. In the same way, pressing cursor buttons 54, 56, 58 will activate the next higher level for the highlighted block if cursoring within the highlighted block is impossible. Change-of-level within a particular block does not influence what is displayed in any other block.

With respect to the PROGRAM mode, FIG. 4 shows the highest level for blocks 104, 108. FIG. 5 shows the highest level for blocks 106, 108. The next lower level has been shown for block 104 in FIG. 5. This displays all separate tracks of the originating display (=first side A, then side B) as respective blocks of standard size. Therefore, this distinguishes from the length-proportional bar display. Moreover, the display distinguishes between tracks that have been selected for playing —shown with a cross—, and non-selected tracks. If the originating block had been block 104 as shown in FIG. 4, the next lower level would have featured only tracks B1 through B7. Within FIG. 5 one track is highlighted. Upon entering, this is always the first track of those shown, irrespective of whether it had been selected or not. By means of cursor buttons 54, 58, the highlighting can be driven through each row of tracks as shown. By means of cursor buttons 56, 60 the highlighting can be stepped to the next row. If no track is present in the corresponding position, the system chooses the closest track in that row. The originating position may be remembered, or not. So, changing from A5 to the next lower row highlights A11. One further row may either highlight B1 or B5. Changing the selection for any highlighted track is done by operating button 50.

With respect to block 106, FIG. 4 shows not the highest, but the second level. Now, there is one smaller block that is highlighted, showing that the play must start at that track which is displayed. Cycling through the tracks is done by rotary button 50, because the highlighting (the subblock within block 106) remains the same. Cycling is through all tracks displayed in block 104, whether according to the showing in FIG. 4, or to the corresponding showing in FIG. 5. Returning to the next higher level is effected by actuating cursor button 54 upon reaching the first displayable track, in this example B1.

In the PROGRAM mode, blocks 104, 106 have two levels, block 108 has only one level. Of course, the number of levels could be different, according to needs and intended user interest.

On the highest level, rotary button 50 may cycle the contents through the various blocks, for example, as follows:
 block 106:
  default is
   begin side A
  next:
   begin side B
   begin current side
   begin current track
   at current position
   begin specified track (=shown in FIG. 4)
 block 108:
  default is:
   no
  cycling:
   once
   twice
   continually.

In another realization, the length-proportional display had been suppressed only for the program mode, in favor of another formalized proposal that would specify the pause between successive tracks. Default value would have been zero, whereas the various possibilities could be geometrically (1, 2, 4, 8, ...) or linearly (1, 2, 3, 4, ...) increasing. If during play, moving along unselected tracks would take longer than the specified pause, the actually attainable value would be taken.

Figure 6:
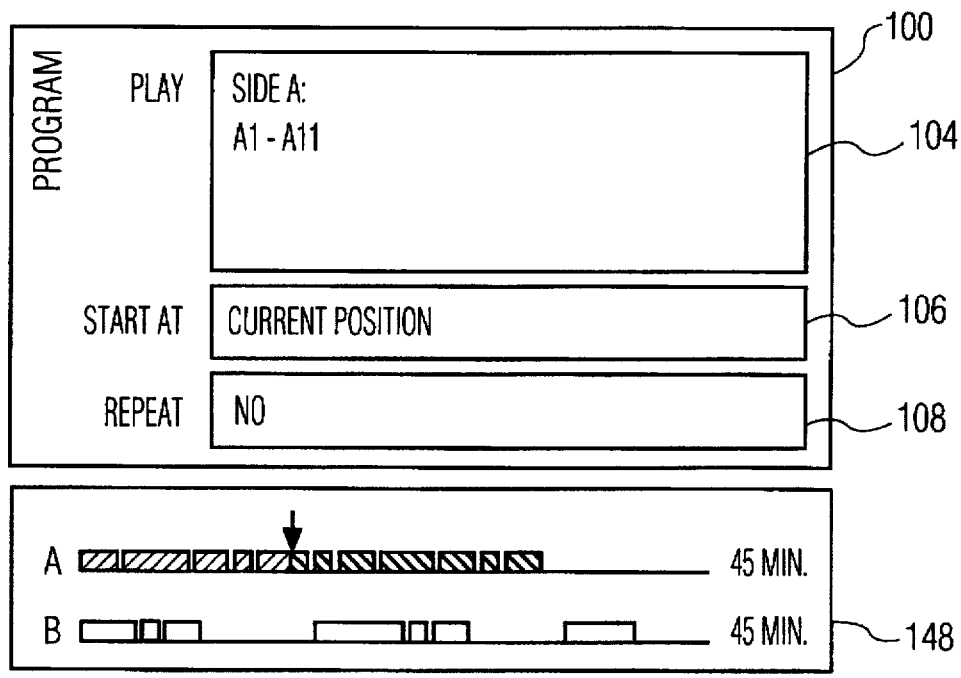

FIG. 6 is a further PROGRAM layout. In the length-proportional linear bar display 148 for both sides the tracks sequence show activity levels and current position of pick-up head. In the Figure, the bar has been shown inside separate block 148. Of course, the configuration of this block as such, is a question of discretion. With respect to FIGS. 1, 3, the color assignment is different: now, light grey is past, dark grey is future, whim is non-selected. In addition to actual pick-up element position shown by a dark cursor arrow, there is a lighter grey cursor arrow actually showing the intended beginning of play. Upon actuating the -GO-button 62, the pick-up element will move to the intended start position, and in so doing, the "present" cursor is moved to the intended cursor position. Upon arrival there, the two will merge. In principle, more than two cursors could be feasible, the third one, for example, indicating the end of intended play.

Figure 7:
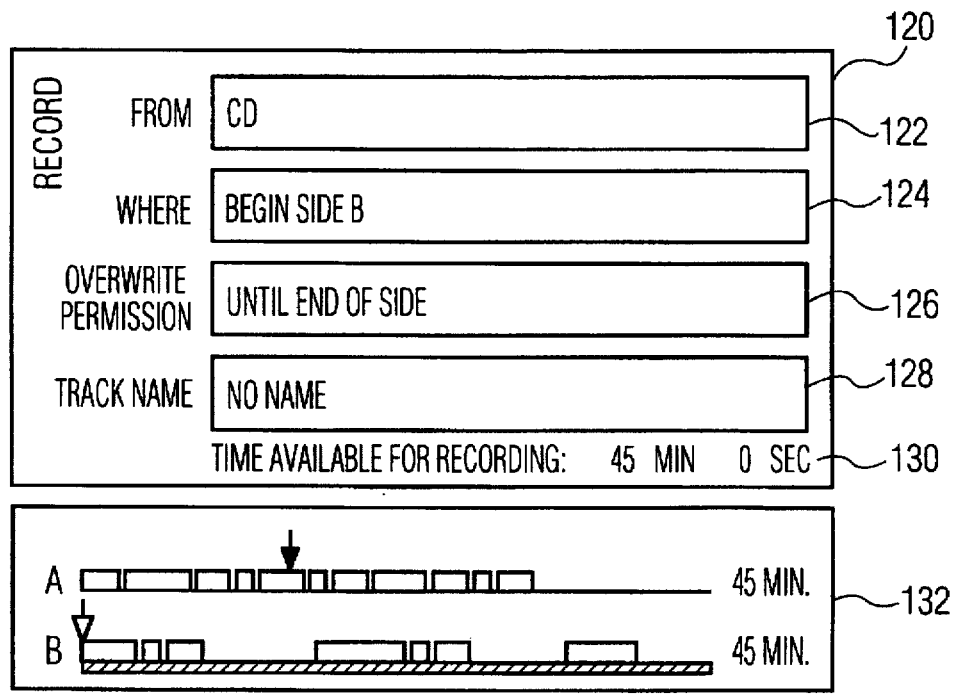
FIG. 7 is a RECORD layout.

FIG. 7 is a RECORD layout that has four blocks 122–128 and text-line 130 within main block 120. The length-proportional bar display is in block 132. Highlighting has not been shown and in the Figure, all blocks 122–128 are at highest level. Block 122 shows audio source that may be compact disc, radio, record player, microphone, auxiliary. Second block 124 shows where to record, that may be after last track, side A or (B), begin side A(B), begin current track, after current track, begin selected track, end selected track. In the latter two cases, at the next lower level, cycling may be effected through all tracks on either side A, B. Third block 126 shows overwrite permission that may be until end of side, until begin of next track, or until begin of selected track. In the latter case, at the next lower level the system may cycle along all tracks. The fourth block 128 may show track name. Track may have no name or name as specifiable by the table of contents. The substance of the name could be the composer, the title of item or song, principal performer, or other. Finally, text line 130 shows the time actually available for recording: 45 minutes 0 secs. During the specifying of the items of blocks 124, 126, the time content of this line is updated when necessary. During actual recording the time content of this line is real-time updated, together with actual running of the medium.

Length-proportional bar display 132 again shows the various tracks, together with current position of pick-up element as a dark arrow, and the intended starting point of the recording as a lighter arrow. Display of tracks is now as a single colour, as far as they have actually been recorded. Furthermore, a separate band at the lower edge of side B indicates the region where recording is to take place. If the user wants to know the content of what is to be overwritten, a changeover to the information display of FIG. 3 should be made.

Figure 8:
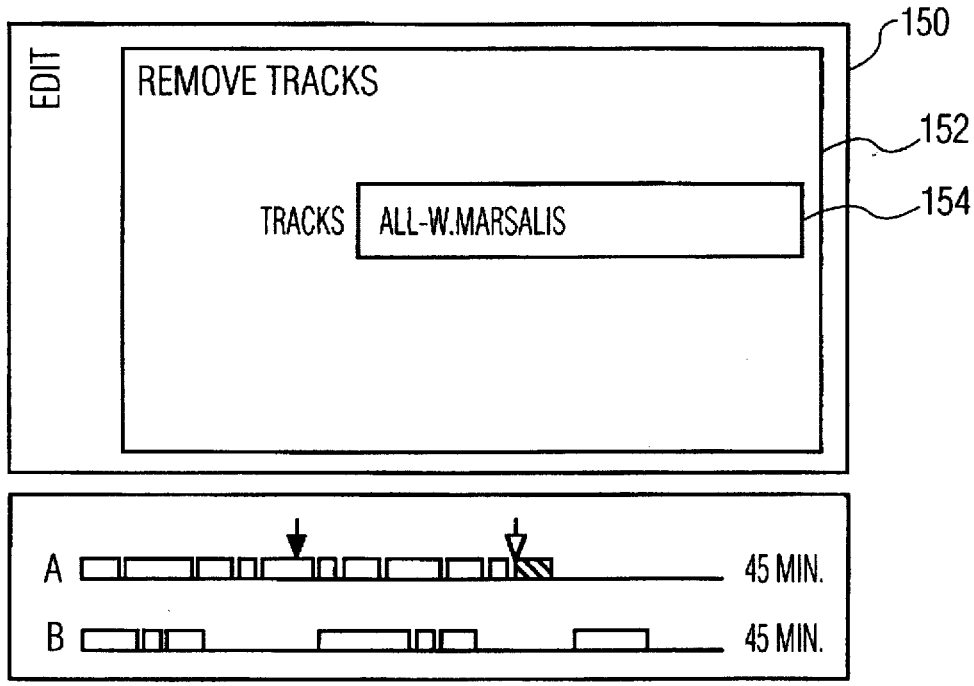
FIGS. 8-12 are EDIT layouts.

FIGS. 8–12 show EDIT mode, which is divided into submodes, that can be cycled through rotary button 50. FIG. 8 shows the remove-tracks submode. Overall block 150 contains submode blocks 152. On the next lower level block 154 shows the track or tracks that may be removed. Pressing GO button 62 would execute the removing. The selections are, for example, all tracks side A+B, all tracks side A, ditto B, current track, particular selected track. In the latter case default is at first track side A; when the system goes one level deeper, this track is actually shown by number and name. Thereafter, rotary button 50 will successively cycle through all respective tracks. In this case, the target cursor (lighter) in block 160 indicates the beginning of what is to be removed, whereas the part to be removed is shown in a different color (grey) from the tracks not to be removed; therefore, the grey arrow points at a notional pick-up element position that need not become an actual one.

Figure 9:
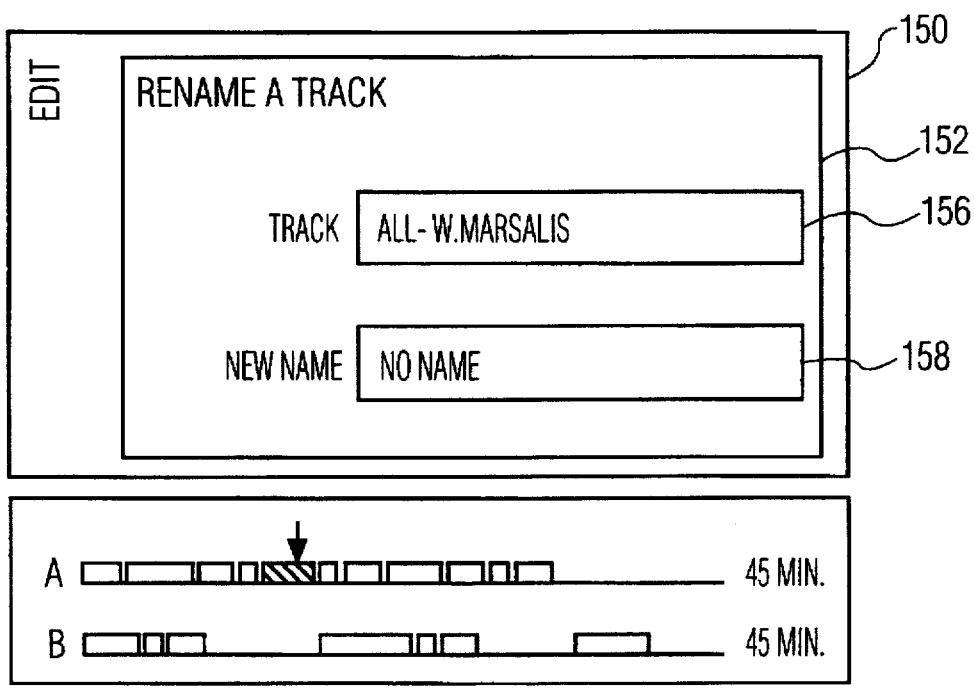

FIG. 9 shows the rename a track submode. Selecting submode is by button 50. One level deeper allows to step between blocks 156 and 158 by cursoring. Highlighting block 156 allows to specify a track. Cycling may be through current track/selectable track, so that at next lower level the names are cycled, or the cycling may be at the level shown. Highlighting block 158 allows for the current track. A separate possibility is to compose a name, which must be done at a next lower level. Cursoring is then through character positions in sequence, whereas character selection is by cycling with button 50.

Figure 10:
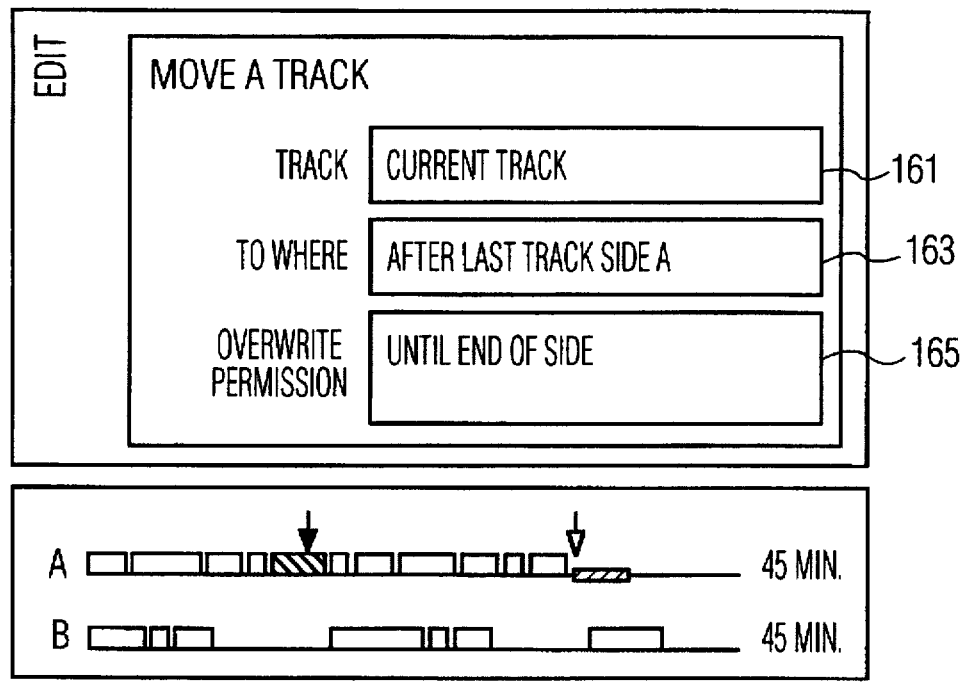

FIG. 10 shows the move track submode. This has the origin track (161) shown in the same way as remove track. The destination position (163, 165) is handled as shown in the same way as the record function described earlier.

Figure 11:
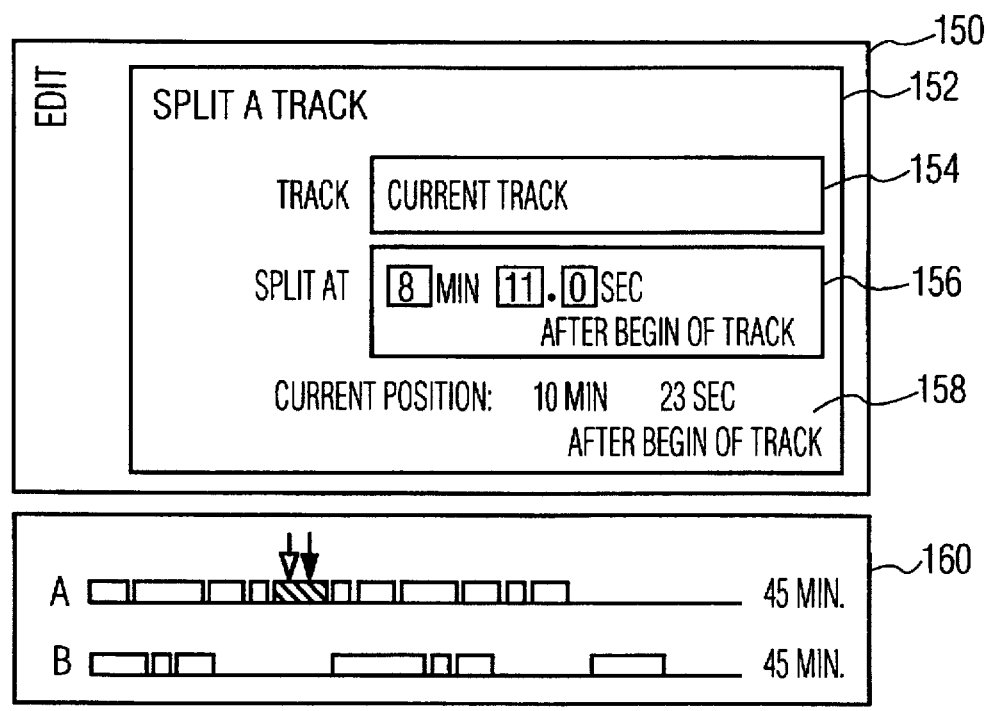

FIG. 11 shows the split a track submode. Track selection (154) is as in rename track, but now, in next block 156 the splitting position is to be specified, either at current position, or in three successive cursor positions cycling through minutes, seconds, tenths of seconds after begin of (current) track (block 156). The changing of the respective time values is done by rotary control element 50. As shown, during the split function, also the current position of the pick-up element is shown by the dark cursor whereas the splitting position is indicated by the lighter cursor arrow.

Figure 12:
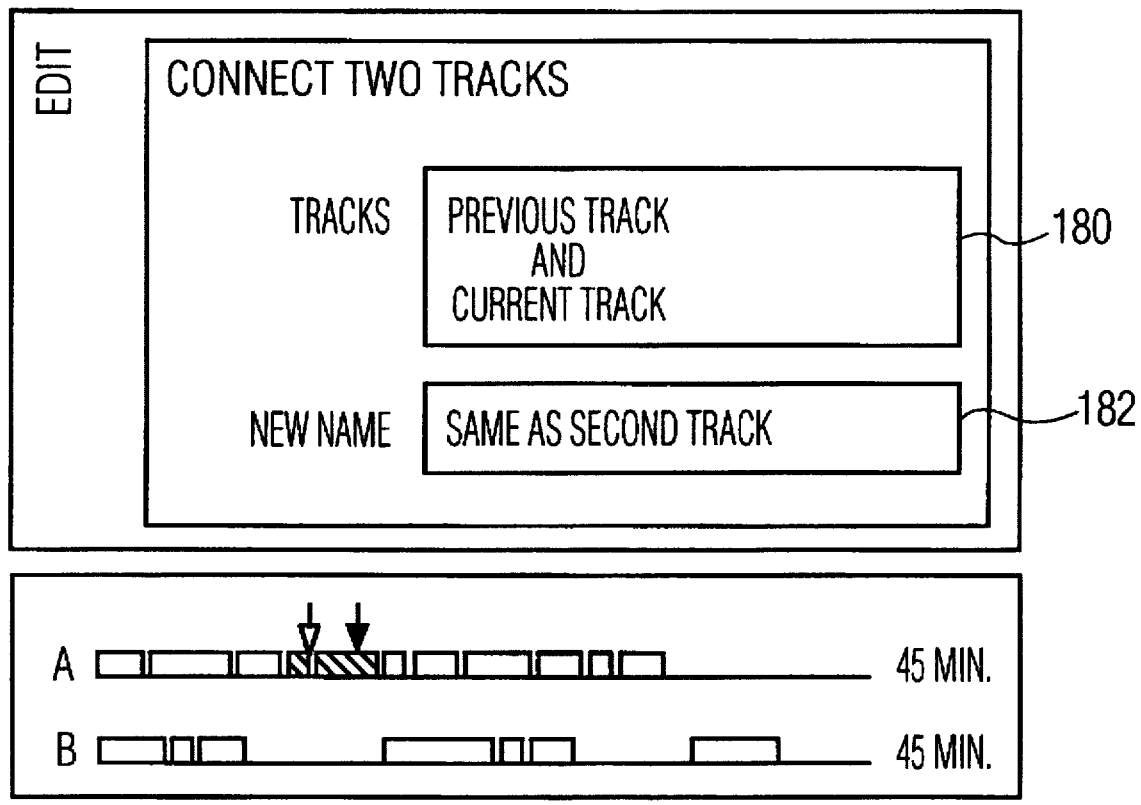

FIG. 12 shows the connect two tracks submode. This is selectable (180) on current track and next track, or on previous track and current track. Also, in block 182 the name of the connected tracks can be chosen as same as first track, same as second track, or no name. In the first two cases, on the next lower level cycling through the respective names of the track in question can be effected through actuating rotary control element 50. In the connect function, text display 158 is not used. The current track and position are indicated by the darker cursor. The lighter cursor indicates the beginning of the track that is to be connected to the current track. For the connect operation, there is a maximum allowed spacing between the tracks to be connected. If the spacing is too large, an error message is displayed and the connecting is only effectible if the two tracks are moved towards each other.

Likewise, various other error situations when occurring, are signalled to a user. In certain situations, operating GO-button 62 will elicit a particular illustrating feedback noise or sound.

We claim:

1. A consumer apparatus comprising:

physical actuation means for selecting a top specifying mode and an executing mode;

visual display means for, in said top specifying mode, displaying a first static array of a plurality of proposal fields, each of said proposal fields being arranged in a respective unique fixed position on said visual display means, and each of said proposal fields being associated to a respective unique list of formatted proposals each fittable within the proposal field of its associated list, but of which proposals, only a single proposal is activated and displayed in the associated proposal field, while all other proposals of the list in question are hidden, each of said proposal fields remaining displayed in said respective unique fixed position;

cursoring means for reversibly cursoring along said proposal fields, and through selecting, reversibly activating one single displayed proposal field while keeping all other displayed proposal fields deactivated;

cycling means for, exclusively, with respect to an actually activated proposal field, reversibly cycling through said unique list of formatted proposals associated with said actually activated proposal field, and reversibly activating a selectable single one of said formatted proposals for display in that proposal field, while maintaining display positions and contents of all other proposal fields as chosen most recently in the past unchanged; and fixating means for, at a transition from said top specifying mode to said executing mode, fixating all actually displayed proposals for execution according to all proposals being actually displayed in all of said displayed proposal fields.

2. A consumer apparatus according to claim 1, wherein said visual display means further includes a display portion showing an overall status of said consumer apparatus, said display portion being one-dimensional.

3. A consumer apparatus as claimed in claim 1, and having level stepping means for, with respect to said activated formatted proposal field, stepping to a next lower level, for calling, at said next lower level, a second list of further formatted proposals, said second list being uniquely associated to the proposal field in question, a single proposal of said second list of further formatted proposals being activated and displayed in the associated proposal field, while all other proposals of said second list of further formatted proposals are hidden; said cycling means being arranged for then reversibly cycling along said second list of further formatted proposals and activating a single further formatted proposal, while maintaining display positions and contents of all other original proposal fields unchange, and said fixating means being arranged for, at a transition from said specifying mode to said executing mode, fixating all actually displayed further formatted proposals as well as all proposals that had been specified most recently in their associated respective proposal fields for execution according to all fixated proposals.

4. A consumer apparatus as claimed in claim 1, and having level stepping means for, with respect to said activated formatted proposal field, stepping to a different lower level of proposals that displays in said activated proposal field, a second array of proposal fields that are selectively activated by said cursoring means, each of said proposal fields in said second array of proposal fields having a respective unique list of proposals, said cycling mean, when a selected one of said proposal fields is activated by said cursoring means, cycling through said unique list of proposals.

5. A consumer apparatus as claimed in claim 4, wherein said proposal fields in second array are substantially one-dimensional along a first cursoring axis which differs from a second cursoring axis of any higher level and also substantially one-dimensional array of elements.

6. A consumer apparatus as claimed in claim 1, wherein said activated proposal field is highlighted with respect to any other proposal field.

7. A consumer apparatus as claimed in claim 3, wherein said level stepping means is a particular cursoring actuation element that enables level stepping upon reading an end of its associated cursoring motion direction.

8. A consumer apparatus as claimed in claim 7 and having a plurality of cursoring actuation elements, of which only a first one enables downstepping whereas all others exclusively enable upstepping through said levels.

9. A consumer apparatus as claimed in claim 8, wherein said first one element is visually differentiated with respect to other cursoring actuation elements.

10. A consumer apparatus as claimed in claim 1 and having at least two different specifying modes.

11. A consumer apparatus as claimed in claim 10, wherein any said specifying mode is directly enterable by means of a respective unique user actuation element.

12. A consumer apparatus as claimed in claim 1 for playing a linear information-carrying medium and reproducing said information.

13. A consumer apparatus as claimed in claim 12 and having record, play and programming modes.

14. A consumer apparatus as claimed in claim 13 and having an edit mode.

15. A consumer apparatus as claimed in claim 12 and having further visual display means for indicating respective different activity levels of information present on said medium, as representable in a length-proportional display of identifiable discrete parts of said information as being further specified by a representation associated to said actualized element.

* * * * *